United States Patent [19]

Hoshino et al.

[11] 4,443,503

[45] Apr. 17, 1984

[54] ANTI-CORROSIVE COATING COMPOSITION AND PROCESS FOR FORMATION OF ANTI-CORROSIVE COATINGS

[75] Inventors: Minoru Hoshino, Yokohama; Tosio Shinohara, Fujisawa; Hiroyuki Tanabe, Yokohama; Tooru Taki, Yamato; Shunsuke Nakayama, Yokohama, all of Japan

[73] Assignee: Dai Nippon Toryo Co., Ltd., Osaka, Japan

[21] Appl. No.: 414,458

[22] Filed: Sep. 2, 1982

Related U.S. Application Data

[62] Division of Ser. No. 201,606, Oct. 28, 1980, Pat. No. 4,363,889.

[30] Foreign Application Priority Data

Dec. 19, 1979 [JP] Japan .................................. 54-165087
Dec. 20, 1979 [JP] Japan .................................. 54-166205

[51] Int. Cl.³ .......................... B05D 1/02; B05D 7/14
[52] U.S. Cl. .................................. 427/421; 427/388.1; 427/388.2; 427/388.5

[58] Field of Search ................. 427/421, 388.1, 388.5, 427/388.2

[56] References Cited

U.S. PATENT DOCUMENTS

| | | | |
|---|---|---|---|
| 3,653,958 | 4/1972 | Gangi ................................. | 428/433 |
| 3,954,482 | 5/1976 | Novack ............................... | 524/601 |
| 4,251,573 | 2/1981 | Holm et al. ......................... | 427/421 |

*Primary Examiner*—J. Ziegler
*Attorney, Agent, or Firm*—Bucknam and Archer

[57] ABSTRACT

Disclosed is an anti-corrosive coating composition comprising (a) 100 parts by weight of an unsaturated polyester resin, (b) 10 to 100 parts by weight of a glass flake having an average thickness of 0.5 to 5 microns and an average particle size of 100 to 400 microns, or 10 to 70 parts by weight of said glass flake and 10 to 150 parts of scaly metal pigment, (c) 0.1 to 1.0 part by weight of a ketone peroxide and (d) 0.5 to 2.0 parts by weight of a hydroperoxide and/or a peroxy ester. Also disclosed is a process for forming anti-corrosive coatings, which comprises spray-coating the above anti-corrosive coating composition to a thickness of 300 to 1500 microns by using a spray gun having a spray tip diameter of 0.5 to 3 mm.

8 Claims, 4 Drawing Figures

200μ

100μ

100μ

100μ

ANTI-CORROSIVE COATING COMPOSITION AND PROCESS FOR FORMATION OF ANTI-CORROSIVE COATINGS

This is a division of application Ser. No. 201,606, filed Oct. 28, 1980, now U.S. Pat. No. 4,363,889.

BACKGROUND OF THE INVENTION

1. Field of the Invention

The present invention relates to an anti-corrosive coating composition providing a tough coating excellent in corrosion resistance on an iron or steel substrate, and also to a process for forming such a coating by using this anti-corrosive coating composition.

2. Description of the Prior Art

Resin linings for preventing corrosion and rusting of metals have been used for various pollution-preventing apparatuses and chemical apparatuses and also for tanks, oil tanks of ships and ship bottoms.

From the viewpoint of the normal temperature curing property in situ operation adaptability and the manufacturing cost, unsaturated polyester resins have heretofore been used for formation of these resin linings. As the lining process, there has ordinarily been adopted the so-called FRP lining process in which an organic peroxide is incorporated in advance into a resin, a sheet-like substrate composed of glass fibers is applied to a material to be lined, the sheet-like substrate is impregnated with the resin by using a felt roll or the like and the resin is cured while simultaneously effecting defoaming.

In addition to this FRP lining process, the so-called flake lining process, which comprises coating a composition comprising a resin and a very thin flake composed of a vitreous substance onto a material to be coated by using a trowel has recently attracted attention in the art and has already been put into practice.

As the composition that is used for practising this process, there are known, for example, a protective or decorative coating composition comprising fine glass slices incorporated in an organic resin binder vehicle (see Japanese Patent Publication No. 25368/76) and a lining material formed by filling a lining resin with a glass flake as an anti-corrosive substance and a glass fiber as a reinforcer (see Japanese Patent Application Laid-Open Specification No. 30855/77). Furthermore, there is known a plastic material, paint or insulating paper filled with glass scale which has been rendered hydrophobic or provided with a leafing property by surface treatment with an appropriate material (see Japanese Patent Publication No. 16821/72).

In view of properties of the resulting coatings or films, all of these known compositions are applied to a very great thickness exceeding 2 mm so that the coating operation becomes very expensive. Accordingly, these compositions have only rarely been applied to ordinary steel structures but are used only for very limited purposes such as mentioned above.

If a flake lining now available is used in the form of a film having a thickness of less than 2 mm with a view to reducing the cost, it is impossible to impart the intended properties to the resulting coating film, and hence, such film cannot be put into practical use.

In the above-mentioned composition including glass flakes, in order to effectively exploit the characteristics of glass flakes and control the permeation of corrosive ions by the glass flakes, how to arrange the glass flakes in parallel with the surface of a substrate is a very important problem. In the conventional flake lining process using a coating composition including glass flakes, parallel arrangement of the glass flakes is promoted by levelling the coated surface with a trowel or roller. However, the running cost is increased if such trowel or roller is used, and this process cannot be applied to a structure having a complicated configuration.

As means for eliminating these difficulties involved in the coating operation, there has been proposed a process using a glass flake-containing composition that can be sprayed. For example, there is known a process for forming a polyester laminate, which comprises spraying the surface of a metal with a slow gelling composition prepared by (1) mixing from 30 to 95% by weight, based on the composition, of a polyester resin, from 15 to 50% by weight, based on the composition, of a crosslinking agent and up to 50% by weight, based on the composition, of glass, (2) adding to the mixture prepared in step (1) a product obtained by reacting from 0.1 to 0.5% by weight, based on the composition, of pentanedione with from 0.5 to 1.5% by weight, based on the composition, of a metallic promotor and (3) adding about 1% by weight, based on the composition, of a catalyst capable of generating free radicals to the mixture of step (2) (see U.S. Pat. No. 3,653,954). However, even if spray coating is carried out by using the above-mentioned composition, glass flakes are not arranged in parallel with the surface of a substrate and deviation of the parallel arrangement according to the coating direction (horizontal plane and vertical plane) is large. Accordingly, manifestation of the effect of glass flakes for controlling permeation of corrosive ions can hardly be expected.

As is seen from the foregoing illustration, a coating process or coating composition ensuring substantially parallel arrangement of glass flakes to the surface of a substrate has not been known. In particular, when the coating composition is applied in the form of a thin film, rusting is readily caused from pinholes, resulting in serious defects. More specifically, rust formed on pinholes grows rapidly, and rusting is not limited in the pinhole portion but propagates to the interface between the film and the iron or steel substrate, with the result that such defects as blistering and peeling appear.

SUMMARY OF THE INVENTION

It is therefore a primary object of the present invention to eliminate the foregoing defects involved in the conventional techniques and provide an anti-corrosive coating composition which is characterized in that when the composition is spray-coated, glass flakes contained therein can be arranged substantially in parallel with the surface of a substrate to be coated, whereby a durable coating excellent in corrosion resistance, adhesion, impact resistance and weatherability is obtained and a coating process using this anti-corrosive coating composition.

In accordance with one aspect of the present invention, there is provided an anti-corrosive coating composition comprising 100 parts by weight of an unsaturated polyester resin, 10 to 100 parts by weight of glass flake having an average thickness of 0.5 to 5 microns and an average particle size of 100 to 400 microns, 0.1 to 1.0 part by weight of a ketone peroxide and 0.5 to 2.0 parts by weight of a hydroperoxide and/or a peroxy ester.

In accordance with another aspect of the present invention, there is provided an anti-corrosive coating composition comprising 100 parts by weight of an unsaturated polyester resin, 10 to 70 parts by weight of a glass flake having an average thickness of 0.5 to 5 microns and an average particle size of 100 to 400 microns, 10 to 150 parts by weight of a scaly metal pigment, 0.1 to 1.0 part by weight of a ketone peroxide and 0.5 to 2.0 parts by weight of a hydroperoxide and/or a peroxy ester.

In accordance with still another aspect of the present invention, there is provided a process for forming anti-corrosive coatings, which comprises spray-coating in a coating thickness of 200 to 1500 microns a composition comprising (a) 100 parts by weight of an unsaturated polyester resin, (b) 10 to 100 parts by weight of a glass flake having an average thickness of 0.5 to 5 microns and an average particle size of 100 to 400 microns, or 10 to 70 parts by weight of said glass flake and 10 to 150 parts by weight of scaly metal pigment, (c) 0.1 to 1.0 parts by weight of a ketone peroxide and (d) 0.5 to 2.0 parts by weight of a hydroperoxide and/or a peroxy ester by using a spray gun having a spray tip diameter of 0.5 to 3 mm.

DETAILED DESCRIPTION OF THE PREFERRED EMBODIMENTS

Figure 1:
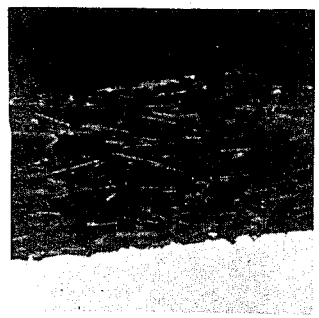
FIG. 1 is a scanning electron microscope photograph of a section of the coating obtained in Example 1.

The present invention relates to an anti-corrosive coating composition for forming a tough coating excellent in corrosion resistance on an iron or steel substrate, and a coating process using this anti-corrosive coating composition.

More specifically, the present invention relates to an anti-corrosive coating composition comprising (a) 100 parts by weight of an unsaturated polyester resin, (b) 10 to 100 parts by weight of glass flake having an average thickness of 0.5 to 5 microns and an average particle size of 100 to 400 microns, or 10 to 70 parts by weight of said glass flake and 10 to 150 parts by weight of a scaly metal pigment, (c) 0.1 to 1.0 parts by weight of a ketone peroxide and (d) 0.5 to 2.0 parts by weight of a hydroperoxide and/or a peroxy ester.

An unsaturated polyester resin which is liquid at normal temperatures without dilution with a volatile solvent and which is cured by a curing agent or catalyst to provide a cured coating excellent in water resistance and chemical resistance is preferably used as the unsaturated polyester resin in the present invention.

All of known unsaturated polyester resins can be used equivalently in the present invention. These unsaturated polyester resins can be synthesized by carrying out an esterification reaction of an unsaturated acid and a saturated acid with a polyhydric alcohol in an inert gas atmosphere and diluting the esterification product with a solvent or polymerizable monomer. As the unsaturated acid and saturated acid, there can be mentioned maleic anhydride, fumaric acid, citraconic acid itaconic acid, tetrachlorophthalic anhydride, Het acid, tetrabromophthalic anhydride, phthalic anhydride, isophthalic acid, terephthalic acid, endomethylene-tetrahydrophthalic anhydride, tetrahydrophthalic acid, hexahydrophthalic anhydride, succinic acid, adipic acid, azelaic acid, sebacic acid, anthrathene-maleic anhydride adduct and rosin-maleic anhydride adduct. These acids may be used singly or in the form of a mixture of two or more of them.

As the polyhydric alcohol to be reacted with the saturated acid and unsaturated acid, there can be mentioned ethylene glycol, diethylene glycol, triethylene glycol, propylene glycol, dipropylene glycol, butane-diol-1,3, butane-diol-1,4, butane-diol-2,3, pentane-diol-1,5, hexane-diol-1,6, neopentyl glycol, 2,2,4-trimethylpentane-diol-1,3, hydrogenated bisphenol A, 2,2-di(4-hydroxypropoxyphenyl)propane, glycerin, pentaerythritol, diallyl ether, trimethylene glycol, 2-ethyl-1,3-hexane-diol, trimethylol propane, cyclohexane-dimethanol-1,4, 2,2,4-tetramethylcyclobutane-diol-1,3, 1,4-bis(2-hydroxyethoxy)benzene and 2,2,4,4-tetramethylcyclobutane-diol-1,3. These polyhydric alcohols may be used singly or in the form of a mixture of two or more of them.

Furthermore, polyester resins obtained by reacting an epoxy resin with an α,β-monoethylenically unsaturated monocarboxylic acid in the presence of a reaction catalyst, if necessary with a polymerization inhibitor, can be used in the present invention.

The epoxy resin that is used for this reaction is a resin having at least two epoxy groups in one molecule. As such epoxy resin, there can be mentioned (1) an epoxy resin synthesized by reacting bisphenol A with epichlorohydrin or methylepichlorohydrin, (2) an epoxy resin synthesized by reacting a glycol with epichlorohydrin or methylepichlorohydrin, (3) an epoxy resin synthesized by reacting a phenol with formaldehyde in the presence of an acidic or alkaline catalyst and reacting the resulting novolak or cresol compound with epichlorohydrin or methylepichlorohydrin, (4) an epoxy resin synthesized by oxidizing intramolecular double bonds, (5) an epoxy resin synthesized by reacting a halogenated phenol with epichlorohydrin or methylepichlorohydrin, (6) an epoxy resin synthesized by adding ethylene oxide or propylene oxide to a phenol and reacting the resulting adduct with epichlorohydrin or methylepichlorohydrin, and (7) an epoxy resin synthesized by reacting a carboxylic acid with epichlorohydrin or methylepichlorohydrin. These epoxy resins may be used singly or in the form of a mixture of two or more of them.

It must be noted that epoxy compounds that can easily be anticipated from the foregoing epoxy resins, and derivatives of these epoxy resins, can be similarly used in the present invention. For example, polyol type epoxy resins, alicyclic epoxy resins and halogen-containing epoxy resins can also be used in the present invention.

As the unsaturated monocarboxylic acid to be reacted with the epoxy resin, there can be mentioned, for example, acrylic acid, methacrylic acid and crotonic acid. Furthermore, monoesters of unsaturated polycarboxylic acids and monoesters of maleic acid can be used. These acids and monoesters may be used singly or in the form of a mixture of two or more of them.

As the reaction catalyst, there can be mentioned amines such as triethylamine and quaternary ammonium salts such as tetramethyl ammonium chloride.

As the polymerization inhibitor, there can be mentioned, for example, hydroquinone, mono-t-butylhydroquinone, p-t-butylcathechol, 2,5-di-t-butylhydroquinone, benzoquinone and 2,5-diphenyl-p-benzoquinone.

As the polymerizable monomer, there can be mentioned, for example, styrene, vinyltoluene, divinylbenzene, vinyl acetate, methacrylic acid, methyl methacrylate, acrylic acid, ethyl acrylate, acrylonitrile, methacrylonitrile, ethylene glycol dimethacrylate, trimethylol propane trimethacrylate, diethylene glycol bisallylcarbonate, diallyl phthalate, 2,5-dichlorostyrene, diallyl ether, triallyl cyanurate, 4-vinylcyclohexanone monoepoxide, vinylpyrrolidone and triallyl phosphate. These monomers can be used singly or in the form of a mixture of two or more of them.

As the solvent, there can be used, for example, aliphatic hydrocarbon solvents, aromatic hydrocarbon solvents, halogenated hydrocarbon solvents, alcoholic solvents, ketone type solvents, ester type solvents, ether type solvents, ketone-alcohol type solvents, ether-alcohol type solvents, ketone-ether type solvents, ketone-ester solvents and ester-ether type solvents. These solvents can be used singly or in the form of a mixture of two or more of them.

The foregoing polyester resins are ordinarily marketed as unsaturated polyester resin in the form of a composition containing about 10 to about 50% by weight of an $\alpha,\beta$-ethylenically unsaturated monomer having a high dissolving power, such as styrene or methyl methacrylate. Accordingly, the unsaturated polyester resin referred to in the present invention contains such monomer.

The glass flake that is used in the present invention is in the form of vitreous, very thin, scaly particles having an average thickness of 0.5 to 5 microns, preferably 1 to 3 microns, and an average particle size of 100 to 400 microns, preferably 150 to 300 microns.

In the present invention, the glass flake is laminated in a plurality of layers in the coating in parallel to the substrate, and serves to increase the strength of the resin and, simultaneously, to prevent permeation and transmission of ambient materials such as vapor and water. This preventive effect is ordinarily enhanced when the thickness of the glass flake is small and the diameter is large. This tendency is conspicuous in a highly corrosive atmosphere or environment.

However, if the thickness of the glass flake is smaller than 0.5 micron, the strength of the glass flake is low and the glass flake cannot be used in practice. On the other hand, if the thickness of the glass flake is larger than 5 microns, the glass flake is seldom arranged in parallel with the substrate. Furthermore, if the size of the glass flake is smaller than 100 microns, the glass flake is soldom arranged in parallel with the substrate, and the strength and corrosion resistance of the coating cannot easily be improved. If the size of the glass flake exceeds 400 microns, the adaptability of the coating composition to the spray-coating operation is reduced and use of a glass flake having such a large size is not preferred.

From the viewpoint of the corrosion resistance and physical properties of the coating, it is preferred that the glass flake be incorporated in an amount of 10 to 100 parts by weight, especially 20 to 70 parts by weight, per 100 parts by weight of the unsaturated polyester resin (inclusive of styrene or the like as pointed out hereinbefore).

When the amount of the glass flake is smaller than 10 parts by weight per 100 parts by weight of the resin, the intended corrosion resistance cannot be obtained. On the other hand, when the amount of the glass flake exceeds 100 parts by weight per 100 parts by weight of the resin, the flexibility of the coating film is reduced and the coating film becomes brittle. Therefore, good results cannot be obtained.

In the present invention, methylethyl ketone peroxide is preferably used as the ketone peroxide.

As the hydroperoxide that is used in the present invention, there can be mentioned, for example, t-butyl hydroperoxide, cumene hydroperoxide, diisopropylbenzone hydroperoxide, p-methane hydroperoxide and 2,5-dimethyl-2,5-dihydroperoxyhexane. Among these hydroperoxides, cumene hydroperoxide and t-butyl hydroperoxide are especially preferred. These hydroperoxides may be used singly or in the form of a mixture of two or more of them.

As the peroxy ester, there can be mentioned, for example, t-butyl peroxyphthalate, t-butyl peroxybenzoate, t-butyl peroxylaurate, t-butyl peroxy-2-hexanoate, t-butyl peroxypivalate, t-butyl peroxyacetate and t-butyl peroxyisobutyrate. Among these peroxy esters, t-butyl peroxyphthalate and t-butyl peroxylaurate are especially preferred. These peroxy esters may be used singly or in the form of a mixture of two or more of them.

In the present invention, by using the ketone peroxide in combination with the hydroperoxide and/or the peroxy ester, the pot life of the coating composition, that is, the curing time of the coating, can be controlled. Accordingly, in the present invention, parallel arrangement of the glass flake in the coating is effectively advanced after spraying, and layers of the glass flake arranged in parallel with the substrate can be formed.

The amounts added of the ketone peroxide and the hydroperoxide and/or the peroxy ester are appropriately determined while the above-mentioned effect is taken into account. Namely, the amounts added of these compounds are readily influenced by the ambient temperature at the coating step.

It was confirmed from the results of our experiments that the ketone peroxide is preferably incorporated in an amount of about 0.6 part by weight at an atmospheric temperature of 5° C., about 0.3 part by weight at an atmospheric temperature of 20° C. or about 0.1 part by weight at an atmospheric temperature of 30° C., per 100 parts by weight of the unsaturated polyester resin solid (inclusive of styrene or the like). It also was found that the hydroperoxide and/or the peroxy ester is preferably incorporated in an amount of about 1.4 parts by weight at an atmospheric temperature of 5° C., about 0.7 part by weight at an atmospheric temperature of 20° C. or about 0.9 part by weight at an atmospheric temperature of 30° C., per 100 parts by weight of the unsaturated polyester solid. If the amounts of these compounds exceed the above-mentioned levels at the respective atmospheric temperatures, the pot life is shortened and the coating operation becomes difficult, and since the coating cures completely is in a short time, there is little parallel arrangement of the glass flake. On the other hand, if the amounts of the compounds are smaller than the above-mentioned levels, the drying time becomes too long.

In the present invention, it is indispensable that the ketone peroxide be used in combination with the hydroperoxide and/or the peroxy ester. The former compound makes contributions to the radical reaction of the unsaturated polyester resin, but if this compound alone is used, the speed of the curing reaction is promoted to too great a degree, and parallel arrangement of the glass flake can hardly be attained. Accordingly, in order to control the radical reaction at normal temperatures, this compound is used in combination with the hydroperoxide and/or the peroxy ester, whereby parallel arrangement of the glass flake is advantageously promoted.

In the composition of the present invention, in order to promote decomposition of the above-mentioned peroxides, it is preferred that at least one curing promoter selected from metal salts of naphthenic acid, such as cobalt naphthenate, manganese naphthenate, copper naphthenate, calcium naphthenate, barium naphthenate, zinc naphthenate and zirconium naphthenate be added in an amount of 0.3 to 1.5 parts by weight per 100 parts by weight of the unsaturated polyester resin.

In accordance with another embodiment of the present invention, scaly metal pigment is incorporated together with the above-mentioned glass flake. In the composition of this embodiment of the present invention, by synergistic effects of the three components, that is, the unsaturated polyester resin, the glass flake and the scaly metal pigment, the defects of the conventional resin linings can be eliminated, and a coating film excellent in corrosion resistance, adhesion and weatherability can be obtained.

More specifically, by lamination of the glass flake and scaly metal pigment, the effect of preventing permeation of corrosive ions can be enhanced, and furthermore, the corrosive ions react with the scaly metal pigment and they are converted to harmless substances before they reach the metal substrate. Attainment of these effects of preventing permeation of the corrosive ions and sequestering the corrosive ions is due to the fact that the pigment is scaly. Furthermore, when the scaly metal pigment is used, the ductility possessed by the metal is given to the coating film and hence, the flexibility of the coating film is improved. This effect is especially important for improving poor physical properties of a thick coating.

A scaly metal pigment which is stable in the unsaturated polyester resin is preferably used in the present invention. For example, there are preferably employed scaly lead powder, scaly zinc powder, scaly stainless steel powder, scaly aluminum powder and scaly copper powder. A scaly anti-corrosive pigment represented by scaly lead powder and scaly zinc powder having a high anti-corrosive action to metals is especially preferred. It is preferred that the average particle size of the scaly metal pigment be 30 to 300 microns, especially 50 to 250 microns, and the average thickness be 3 to 10 microns, especially 4 to 7 microns.

When the average particle size of the metal pigment is smaller than 30 microns, the pigment is not substantially scaly and attainment of the effect of preventing permeation of corrosive ions in the coating can hardly be expected. On the other hand, if the average particle size of the scaly metal pigment exceeds 300 microns, the pigment receives the viscous resistance of the resin in the coating, with the result that parallel arrangement of the pigment is hard to attain, or that the strength of the pigment per se is reduced. Accordingly, in this case, at the paint-preparing step (kneading step) or the coating step, the pigment is readily bent or broken and the pigment is no longer scaly. Therefore, the intended objects of the present invention cannot be attained.

Furthermore, when a coating composition comprising a metal pigment having an average particle size exceeding 300 microns is spray-coated, the spray tip is readily clogged with the metal pigment and the coating operation efficiency is reduced. Accordingly, use of such metal pigment is not preferred.

It is ordinarily preferred that the scaly metal pigment be used in an amount of 10 to 150 parts by weight, especially 15 to 90 parts by weight, per 100 parts by weight of the unsaturated polyester resin.

If the amount of the scaly metal pigment is smaller than 10 parts by weight per 100 parts by weight of the unsaturated polyester resin, the toughness, flexibility and corrosion resistance are reduced, and if the amount of the scaly metal pigment is larger than 150 parts by weight per 100 parts by weight of the unsaturated polyester resin, the coating film becomes brittle. Accordingly, it is not preferred to use the scaly metal pigment in too large an amount or too small an amount.

In this embodiment where the above-mentioned scaly metal pigment is used, the glass flake is used in an amount of 10 to 70 parts by weight, preferably 20 to 60 parts by weight, per 100 parts by weight of the unsaturated polyester resin (inclusive of styrene or the like). If the glass flake is used in an amount included in this range, the corrosion resistance and physical properties of the coating are improved.

More specifically, if the amount of the glass flake is smaller than 10 parts by weight per 100 parts by weight of the unsaturated polyester resin, the intended corrosion resistance cannot be obtained, and if the amount of the glass flake is larger than 70 parts by weight of the unsaturated polyester resin, the flexibility is reduced and the coating becomes brittle. Accordingly, in each case, good results cannot be obtained.

In the above-mentioned coating composition of the present invention, additives such as curing promotors, coloring pigments, extender pigments, anti-corrosive pigments, precipitation-inhibiting agents, dispersants, diluents and other scaly pigments may be incorporated, according to need.

The anti-corrosive composition of the present invention is obtained by mixing the unsaturated polyester resin, the glass flake and, according to need, the scaly metal pigment and other additives such as a curing promotor, other pigments and the like according to a customary method using a disperser or the like, and adding as the curing agent the ketone peroxide and the hydroperoxide and/or the peroxy ester at the time of application.

In the present invention, the so obtained anti-corrosive composition is coated on a substrate to be coated according to the spray-coating method. Compressed air spray and airless spray are suitable as the spray-coating method. In case of the compressed air spray, an air pressure of at least 4 $Kg/cm^2$ is preferred, and in case of an airless spray, a primary air pressure of at least 5 $Kg/cm^2$ and a compression ratio of at least 30/1 are preferred. It is preferred that the spray tip diameter be 0.5 to 3 mm, especially 0.75 to 2 mm. If the spray tip diameter is smaller than 0.5 mm, the tip is clogged with the glass flake and it becomes impossible to perform the coating operation smoothly. In contrast, if the tip diameter is larger than 3 mm, the spray pattern is not expanded in a good condition.

In the coating process of the present invention, the coating composition is coated on the substrate in a dry coating film thickness of 300 to 1500 microns, preferably 500 to 1200 microns, according to the above-mentioned coating procedures. If the coating thickness is smaller than 300 microns, the corrosion resistance of the coating is reduced and parallel arrangement of the glass flake in the coating is hard to attain, so that good results cannot be obtained. If the thickness of the coating is larger than 1500 microns, sagging is caused and no good coating is obtained. After the coating operation, the applied coating composition is dried at normal temperatures and the intended coating is formed.

As is apparent from the foregoing illustration, if the specific coating composition is spray-coated under specific conditions, the glass flake and scaly metal pigment are arranged in the coating in parallel to the substrate. Accordingly, there can be obtained a coating excellent in corrosion resistance, chemical resistance, weatherability, adhesion and strength.

If desired, a topcoat paint composed of a chlorinated rubber, an alkyd resin, an epoxy resin, an urethane resin or an acrylic resin or a topcoat paint comprising an unsaturated polyester resin and glass flake may be coated on the coating formed according to the present invention. The coating obtained according to the present invention has also an excellent adhesion to such topcoat paint.

The present invention will now be described with reference to the following Examples and Comparative Examples that by no means limit the scope of the invention.

EXAMPLE 1

| Formula 1: | |
|---|---|
| Main ingredients: | |
| Unsaturated polyester resin (Rigolac 150 HR manufactured by Showa High Polymer Co. Ltd.: Isophthalic acid type) | 37 parts by weight |
| Organic bentonite (Bentone #34 manufactured by National Lead Co. Ltd.) | 2.0 parts by weight |
| Styrene | 35.5 parts by weight |
| Cobalt naphthenate (containing 6% of metallic cobalt) | 0.5 part by weight |
| Glass flake (average particle size = 200 microns, average thickness = 2-3 microns) | 15 parts by weight |
| Talc | 5 parts by weight |
| Titanium oxide | 5 parts by weight |
| Total | 100 parts by weight |
| Curing agents: | |
| Methylethyl ketone peroxide | 0.1 part by weight |
| Cumene hydroperoxide | 0.3 part by weight |

Among the main ingredients of formula 1, the unsaturated polyester resin was first mixed with the organic bentonite and the mixture was kneaded by a roller. The remaining main ingredients were added to the mixture, and the mixture was stirred with a disperser to form a main ingredient composition. A soft steel plate (JIS G-3141) having a size of 150 mm×50 mm×1.6 mm was subjected to shot blasting to remove will scale, rust and oil completely. The main ingredient composition of formula 1 in which the curing agents had been incorporated was coated on this steel plate to a dry coating thickness of 500±50 microns by compressed air spraing (tip diameter=1 mm). The coating was dried at 20° C. for 7 days, and the coated steel plate was subjected to comparison tests.

Figure 2:
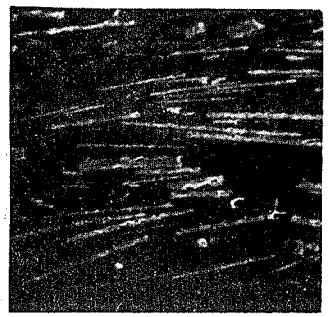
FIG. 2 is an enlarged photograph of a portion of the coating shown in FIG. 1.

Photographs of the section of the coating obtained in Example 1, taken by using a scanning electron microscope, are shown in FIGS. 1 and 2 for reference.

EXAMPLE 2

| Formula 2: | |
|---|---|
| Main ingredients: | |
| Unsaturated polyester resin (Rigolac LP-1 manufactured by Showa High Polymer Co., Ltd.: Bisphenol type) | 40 parts by weight |
| Organic bentonite (same as used in Example 1) | 3.0 parts by weight |
| Paraffin wax | 0.3 part by weight |
| Styrene | 11.2 parts by weight |
| Cobalt naphthenate (same as used in Example 1) | 0.5 part by weight |
| Glass flake (same as used in Example 1) | 25 parts by weight |
| Talc | 15 parts by weight |
| Titanium oxide | 5 parts by weight |
| Total | 100 parts by weight |
| Curing agents: | |
| Methylethyl ketone peroxide | 0.15 part by weight |
| t-Butyl peroxyphthalate | 0.3 part by weight |

A coating composition of formula 2, formed by kneading in the same manner as described in Example 1, was coated on the same type of steel plate sample used in Example 1, and the coated steel plate was subjected to comparison tests.

EXAMPLE 3

| Formula 3: | |
|---|---|
| Main ingredients: | |
| Unsaturated polyester resin (Repoxy R-800 manufactured by Showa High Polymer Co., Ltd.: Epoxy acrylate type) | 50 parts by weight |
| Organic bentonite (same as in Example 1) | 1.0 part by weight |
| Paraffin wax | 0.3 part by weight |
| Styrene | 23.2 parts by weight |
| Cobalt naphthenate (same as in Example 1) | 0.5 part by weight |
| Glass flake (same as in Example 1) | 20 parts by weight |
| Titanium oxide | 5 parts by weight |
| Total | 100 parts by weight |
| Curing agents: | |
| Methylethyl ketone peroxide | 0.3 part by weight |
| t-Butyl peroxyphthalate | 0.7 part by weight |

A composition of recipe formula 3, which was formed by kneading in the same manner as described in Example 1 was airless-spray-coated on the same type of steel plate sample as used in Example 1, so that the dry coating thickness was 500±50 microns (the tip diameter was 1 mm). The coated steel plate was dried at 5° C. and subjected to comparison tests.

EXAMPLE 4

| Formula 4: | |
|---|---|
| Main ingredients: | |
| Unsaturated polyester resin (UPICA 5523 manufactured by Japan U.PICA Co. Ltd.: Isophtalic acid type) | 40 parts by weight |
| Organic bentonite (Bentone #34 manufactured by National Lead Co. Ltd.) | 2.0 parts by weight |
| Styrene | 20 parts by weight |
| Cobalt naphthenate (containing 6% of metallic cobalt) | 0.5 part by weight |

-continued

| Formula 4: | |
|---|---|
| Glass flake (same as used in Example 1) | 20 parts by weight |
| Talc | 10 parts by weight |
| Titanium oxide | 7.5 parts by weight |
| Total | 100 parts by weight |
| Curing agents: | |
| Methylethyl ketone peroxide | 0.2 part by weight |
| Cumene hydroperoxide | 0.5 part by weight |

A coating composition of formula 4, formed by kneading in the same manner as in Example 1, was coated on the same type of steel plate sample as used in Example 1 and the coated steel plate was subjected to comparison tests.

EXAMPLE 5

| Formula 5: | |
|---|---|
| Main ingredients: | |
| Unsaturated polyester resin (Atlac 382-05 manufactured by Kao = Atlas Co. Ltd.: Bisphenol type) | 45 parts by weight |
| Organic bentonite (same as used in Example 1) | 2.0 parts by weight |
| Paraffin wax | 0.3 part by weight |
| Styrene | 19.7 parts by weight |
| Cobalt naphthenate (same as used in Example 1) | 0.5 part by weight |
| Glass flake (same as used in Example 1) | 20 parts by weight |
| Talc | 7 parts by weight |
| Titanium oxide | 5.5 parts by weight |
| Total | 100 parts by weight |
| Curing agents: | |
| Methylethyl ketone peroxide | 0.1 part by weight |
| t-Butyl peroxyphthalate | 0.4 part by weight |

A coating composition of formula 5, formed by kneading in the same manner as in Example 1, was coated on the same type of steel plate sample as used in Example 1, and the coated steel plate was subjected to comparison tests.

COMPARATIVE EXAMPLE 1

| Formula 6: | |
|---|---|
| Main ingredients: | |
| Unsaturated polyester resin (same as used in Example 1) | 50 parts by weight |
| Organic bentonite (same as used in Example 1) | 2.5 parts by weight |
| Styrene | 26.7 parts by weight |
| Cobalt naphthenate (same as used in Example 1) | 0.8 part by weight |
| Glass flake (average particle size = 40 microns, average thickness = 2-3 microns) | 20 parts by weight |
| Total | 100 parts by weight |
| Curing agent: | |
| Methylethyl ketone peroxide | 1.5 parts by weight |

A coating composition of formula 6 was air-spray-coated on the same type of steel plate sample as used in Example 1 so that the dry coating thickness was 500±50 microns. The coated sample was dried at room temperature for 7 days and subjected to comparison tests.

Figure 3:
FIG. 3 is a scanning electron microscope photograph of the coating obtained in Comparative Example 1.

For reference, a photograph of the section of the so obtained coating taken by using a scanning electron microscope is shown in FIG. 3.

COMPARATIVE EXAMPLE 2

| Formula 7: | |
|---|---|
| Main ingredients: | |
| Unsaturated polyester resin (same as used in Example 1) | 45 parts by weight |
| Organic bentonite (same as used in Example 1) | 2.5 parts by weight |
| Styrene | 21.7 parts by weight |
| Cobalt naphthenate (same as used in Example 1) | 0.8 part by weight |
| Glass flake (same as used in Example 1) | 30 parts by weight |
| Total | 100 parts by weight |
| Curing agent: | |
| t-Butyl peroxybenzoate | 2.0 parts by weight |

A coating composition of recipe 7 was air-spray-coated on the same type of steel plate sample as used in Example 1 so that the dry coating thickness was 500±50 microns, and the coated steel plate was dried at room temperature for 7 days and subjected to comparison tests.

COMPARATIVE EXAMPLE 3

| Formula 8: | |
|---|---|
| Main ingredients: | |
| Unsaturated polyester resin (same as used in Example 1) | 45.0 parts by weight |
| Titanium white | 1.0 part by weight |
| Thixotropic agent (powdery silica) | 2.0 parts by weight |
| Paraffin wax (air releasing agent) | 0.06 part by weight |
| Styrene | 25.86 parts by weight |
| Glass flake (same as used in Example 1) | 25.0 parts by weight |
| Propylene glycol | 0.68 part by weight |
| Cobalt tallate | 0.2 part by weight |
| Pentane dione | 0.2 part by weight |
| Total | 100 parts by weight |
| Curing agent: | |
| t-Butyl peroxybenzoate | 1.0 part by weight |

A coating composition of formula 8 was air-spray-coated on the same type of steel plate sample as used in Example 1 so that the dry coating thickness was 500±50 microns, and the coated steel plate was dried at room temperature for 7 days and subjected to comparison tests.

The results of the comparison tests made on coatings formed in the foregoing Examples and Comparative Examples are shown in Table 1.

TABLE 1

| | Example 1 | Example 2 | Example 3 | Example 4 |
|---|---|---|---|---|
| Salt spray resistance test[1] | no change | no change | no change | no change |
| Adhesion test (Kg/cm$^2$)[2] | 65 | 60 | 63 | 60 |
| Weather resistance test[3] | no change | no change | no change | no change |
| Service water dip resistance test[4] | 29 days | 30 days | 35 days | 40 days |
| Alkali resistance test[5] | no change | no change | no change | no change |
| Acid resis- | no | " | " | " |

TABLE 1-continued

|  | Example 5 | Comparative Example 1 | Comparative Example 2 | Comparative Example 3 |
|---|---|---|---|---|
| tance test[6] | change | " | " | " |
| Humidity resistance test[7] | no change | " | " | " |
| Impact resistance test[8] | no change | " | " | " |
| Salt spray resistance test[1] | no change | rusting of coating from cut portion | rusting of coating from cut portion | rusting of coating from cut portion |
| Adhesion test (Kg/cm²)[2] | 63 | 40 | 25 | 43 |
| Weather resistance test[3] | no change | partial peeling at periphery of cut portion | partial peeling at periphery of cut portion | partial peeling at periphery of cut portion |
| Service water dip resistance test[4] | 40 days | 18 days | 10 days | 22 days |
| Alkali resistance test[5] | no change | partial blistering and rusting on coating | partial blistering and rusting on coating | partial blistering and rusting on coating |
| Acid resistance test[6] | no change | partial blistering and rusting on coating | partial blistering and rusting on coating | partial blistering and rusting on coating |
| Humidity resistance test[7] | no change | partial blistering and rusting on coating | partial blistering and rusting on coating | partial blistering and rusting on coating |
| Impact resistance test[8] | no change | cracking | cracking | cracking |

Note
[1] sequare cross cuts were formed in the coating and after 1000 hours of salt spray, the coating was peeled and a check was made to determine whether or not rusting had advanced below the coating from the cut portion
[2] the coating was tested by a Tensilon tester and the strength per cm² necessary for breakage of the coating was measured
[3] cuts were formed in the coating, the coating was tested for 500 hours by a weatherometer, the coating was folded at an angle of 20° and the state of the coating was examined
[4] the sample was immersed in service water maintained at 60° C. and the number of days for the appearance of any change in the coating were recorded
[5] the sample was immersed in a 5% aqueous solution of sodium hydroxide for 5 months
[6] the sample was immersedin a 20% aqueous solution of hydrochloric acid for 5 months
[7] the sample was allowed to stand at a relative humidity of 100% for 1000 hours
[8] the sample was tested by a Du Pont impact tester under conditions of 1 Kg × ½"R × 50 cm

EXAMPLE 6

Formula 9:

| Main ingredients: | |
|---|---|
| Unsaturated polyester resin (Rigolac 150HR manufactured by Showa High Polymer Co. Ltd.: Isophthalic acid type) | 40 parts by weight |
| Organic bentonite (Bentene #34 manufactured by National Lead Co. Ltd.) | 2.0 parts by weight |
| Styrene | 32.5 parts by weight |
| Cobalt naphthenate (containing 6% of metallic cobalt) | 0.5 part by weight |
| Glass flake (average particle size = 150 to 200 microns, average thickness = 3 to 5 microns) | 15 parts by weight |
| Scaly lead powder (manufactured by Fukuda Metal Foil and Powder Co. Ltd., average particle size = 150 to 200 microns, average thickness = 4 to 6 microns) | 10 parts by weight |
| Total | 100 parts by weight |
| Curing agents: | |

Formula 9:

| | |
|---|---|
| Methylethyl ketone peroxide | 0.2 part by weight |
| t-Butyl peroxyphthalate | 0.6 part by weight |

Among the main ingredients of formula 9, the unsaturated polyester resin was first mixed with the organic bentonite, and the mixture was kneaded by a roller. Other ingredients were added to the kneaded mixture and the mixture was stirred by a disperser to form a main ingredient composition. A soft steel plate (JIS G-3141) having a size of 150 mm×50 mm×1.6 mm was subjected to shot blasting to remove mill scale, rest and oil completely. A paint formed by adding the curing agents to the main ingredient composition was air-spray-coated on this steel plate (the tip diameter being 1 mm), so that the dry coating thickness was 500±50 microns, and the coated steel plate was dried at 20° C. for 7 days and subjected to comparison tests.

EXAMPLE 7

Formula 10:

| Main ingredients: | |
|---|---|
| Unsaturated polyester resin (Rigolac LP-1 manufactured by Showa High Polymer Co. Ltd.: Bisphenol type) | 35 parts by weight |
| Organic bentonite (same as used in Example 6) | 3.0 parts by weight |
| Paraffin wax | 0.3 part by weight |
| Styrene | 16.2 parts by weight |
| Cobalt naphthenate (same as used in Example 6) | 0.5 part by weight |
| Glass flake (same as used in Example 6) | 15 parts by weight |
| Scaly zinc powder (manufactured by Sakai Chemical Industries Co. Ltd., average particle size = 50 to 60 microns, average thickness = 6 to 7 microns) | 30 parts by weight |
| Total | 100 parts by weight |
| Curing agents: | |
| Methylethyl ketone peroxide | 0.2 part by weight |
| Cumene hydroperoxide | 0.3 part by weight |

A coating composition of formula 10, formed by kneading in the same manner as in Example 6, was coated on the same type of steel plate sample as used in Example 6, and the coated steel plate was subjected to comparison tests.

Figure 4:
FIG. 4 is a scanning electron microscope photograph of a section of the coating obtained in Example 7.

For reference, a photograph of the section of the coating obtained in this Example, taken by using a scanning electron microscope, is shown in FIG. 4.

EXAMPLE 8

Formula 11:

| Main ingredients: | |
|---|---|
| Unsaturated polyester resin (Repoxy R-800 manufactured by Showa High Polymer Co. Ltd.: Epoxy acrylate type) | 40 parts by weight |
| Organic bentonite (same as used in Example 6) | 1.0 part by weight |
| Paraffin wax | 0.3 part by weight |
| Styrene | 28.2 parts by weight |
| Cobalt naphthenate (same as used in Example 6) | 0.5 part by weight |
| Glass flake (same as used in Example 6) | 15 parts by weight |

-continued

| Formula 11: | |
|---|---|
| Scaly lead powder (same as used in Example 6) | 20 parts by weight |
| Total | 100 parts by weight |
| Curing agents: | |
| Methylethyl ketone peroxide | 0.2 part by weight |
| t-Butyl peroxyphthalate | 0.3 part by weight |

A coating composition of formula 11, formed by kneading in the same manner as in Example 6, was coated on the same type of steel plate sample as used in Example 6 so that the dry coating thickness was 500±50 microns, and the coated steel plate sample was subjected to comparison tests.

EXAMPLE 9

| Formula 12: | |
|---|---|
| Main ingredients: | |
| Unsaturated polyester resin same as used in Example 6 | 40 parts by weight |
| Organic bentonite (same as used in Example 6) | 2.0 parts by weight |
| Styrene | 30.0 parts by weight |
| Cobalt naphthenate (containing 6% of metallic cobalt) | 0.5 part by weight |
| Glass flake (same as used in Example 6) | 20 parts by weight |
| Scaly lead powder (same as used in Example 6) | 7.5 parts by weight |
| Total | 100 parts by weight |
| Curing agents: | |
| Methylethyl ketone peroxide | 0.4 part by weight |
| Cumene hydroperoxide | 0.7 part by weight |

A coating composition of formula 12, formed by kneading in the same manner as in Example 6, was airless-spray-coated on the same type of steel plate sample as used in Example 6 so that the dry coating thickness was 500±50 microns (the tip diameter being 1 mm), and the coated steel plate sample was dried at 5° C. and subjected to comparison tests.

EXAMPLE 10

| Formula 13: | |
|---|---|
| Main ingredients: | |
| Unsaturated polyester resin (same as used in Example 6) | 35 parts by weight |
| Organic bentonite (same as used in Example 6) | 3.0 parts by weight |
| Paraffin wax | 0.3 part by weight |
| Styrene | 16.2 parts by weight |
| Cobalt naphthenate (same as used in Example 6) | 0.5 part by weight |
| Glass flake (same as used in Example 6) | 20 parts by weight |
| Scaly zinc powder (same as used in Example 7) | 25 parts by weight |
| Total | 100 parts by weight |
| Curing agents: | |
| Methylethyl ketone peroxide | 0.4 part by weight |
| t-Butyl peroxyphthalate | 0.8 part by weight |

A coating composition of formula 13, formed by kneading in the same manner as in Example 6, was airless-spray-coated on the same type of steel plate sample as used in Example 6 (the tip diameter being 1 mm) so that the coating dry thickness was 500±50 microns, and the coated steel plate sample was dried at 5° C. and subjected to comparison tests.

COMPARATIVE EXAMPLE 4

| Formula 14: | |
|---|---|
| Main ingredients: | |
| Unsaturated polyester resin (same as used in Example 6) | 45 parts by weight |
| Organic bentonite (same as used in Example 6) | 2.5 parts by weight |
| Styrene | 26.7 parts by weight |
| Cobalt naphthenate (same as used in Example 6) | 0.8 part by weight |
| Glass flake (same as used in Example 6) | 25 parts by weight |
| Total | 100 parts by weight |
| Curing agent: | |
| Methylethyl ketone peroxide | 0.6 part by weight |

A coating composition of formula 14, formed by kneading in the same manner as in Example 6, was coated on the same type of steel plate sample as used in Example 6 so that the dry coating thickness was 500±50 microns, and the coated steel plate sample was dried at room temperature for 7 days and subjected to comparison tests.

The results of the comparison tests made on the coated steel plate samples obtained in the foregoing Examples and Comparative Example are shown in Table 2.

TABLE 2

| | Example 6 | Example 7 | Example 8 |
|---|---|---|---|
| Salt spray resistance test | no change | no change | no change |
| Adhesion test (Kg/cm$^2$) | 65 | 58 | 60 |
| Weather resistance test | no change | no change | no change |
| Service water dip resistance test | 40 days | 39 days | 40 days |
| Alkali resistance test | no change | no change | no change |
| Acid resistance test | " | " | " |
| Humidity resistance test | " | " | " |
| Impact resistance test | " | " | " |

| | Example 9 | Example 10 | Comparative Example 4 |
|---|---|---|---|
| Salt spray resistance test | no change | no change | rusting advanced from cut portion |
| Adhesion test (Kg/cm$^2$) | 60 | 62 | 42 |
| Weather resistance test | no change | no change | partial peeling at periphery of cut portion |
| Service water dip resistance test | 45 days | 50 days | 21 days |
| Alkali resistance test | no change | no change | partial blistering and rusting on coating |
| Acid resistance test | " | " | partial blistering and rusting on coating |
| Humidity resistance test | " | " | partial blistering and rusting on coating |
| Impact resistance | " | " | cracking |

TABLE 2-continued test

Note
The test methods are the same as described in Table 1.

As will readily be understood from the test results shown in Tables 1 and 2 and photographs shown in FIGS. 1 to 4, the coating film obtained from the coating composition of the present invention according to the coating process thereof is highly improved in corrosion resistance over the coating films prepared from the conventional lining compositions, and the coating film obtained according to the present invention is excellent in adhesion, impact resistance, weatherability and chemical resistance. It will also be understood that these effects are attained by synergistic actions of the unsaturated polyester resin and glass flake or the unsaturated polyester resin, glass flake and scaly metal pigment.

What is claimed is:

1. A process for forming an anti-corrosive coating on an iron or a steel substrate, which comprises mixing
   (i) 100 parts by weight of an unsaturated polyester resin containing an $\alpha,\beta$-ethylenically unsaturated monomer,
   (ii) 10 to 70 parts by weight of glass flake having an average particle size of 100 to 400 microns and an average thickness of 0.5 to 5 microns,
   (iii) 10 to 150 parts by weight of a scaly metal pigment having particle size between 30–300 microns;
   (iv) 0.3 to 1.5 parts by weight of curing promoter,
   then adding a member selected from the group consisting of (a) a mixture of 0.1 to 1.0 part by weight of a ketone peroxide and 0.5 to 2.0 parts by weight of a hydroperoxide, (b) a mixture of 0.1 to 1 part by weight of a ketone peroxide and 0.5 to 2 parts by weight of a peroxy ester and (c) a mixture of 0.1 to 1.0 parts by weight of a ketone peroxide, 0.5 to 2 parts by weight of said hydroperoxide and said peroxy ester, and spray coating to a coating thickness of 300 to 1500 microns, by using a spray gun having a spray tip diameter of 0.5 to 3 mm.

2. A process for forming an anti-corrosive coating on an iron or a steel substrate according to claim 1, wherein said unsaturated polyester resin contains 10 to 50% by weight of an $\alpha$-$\beta$-ethylenically unsaturated monomer.

3. A process for forming an anti-corrosive coating on an iron or a steel substrate according to claims 1 or 2 wherein said $\alpha,\beta$-ethylenically unsaturated monomer is styrene or methyl methacrylate.

4. A process for forming an anti-corrosive coating for an iron or a steel substrate according to claim 1 wherein the polyester resin is obtained by reacting an epoxy resin containing at least two epoxy groups per molecule with an $\alpha$-$\beta$-monoethylenically unsaturated monocarboxylic acid.

5. A process for forming an anti-corrosive coating on an iron or a steel substrate according to claim 1, wherein the average particle size of said scaly metal pigment is 30 to 300 microns and the average thickness is 3 to 10 microns.

6. A process for forming an anti-corrosive coating on an iron or a steel substrate according to claim 1 or 4, wherein said scaly metal pigment is a member selected from the group consisting of scaly lead pigment, scaly zinc pigment, scaly aluminum pigment, scaly stainless pigment and scaly copper pigment.

7. A process for forming an anti-corrosive coating on an iron or a steel substrate according to claim 1, wherein said curing promoter is selected from the group consisting of cobalt naphthenate, copper naphthenate, calcium naphthenate, barium naphthenate, zinc naphthenate and zirconium naphthenate.

8. A process for forming an anti-corrosive coating on an iron or a steel substrate according to claims 1, 2 or 6 wherein said spray-coating method is a compressed air spray or airless spray.

* * * * *